United States Patent
Miyahara et al.

(10) Patent No.: US 10,951,777 B2
(45) Date of Patent: Mar. 16, 2021

(54) IMAGE FORMING APPARATUS AND NON-TRANSITORY COMPUTER-READABLE RECORDING MEDIUM STORING IMAGE FORMING PROGRAM

(71) Applicant: KYOCERA Document Solutions Inc., Osaka (JP)

(72) Inventors: Norifumi Miyahara, Osaka (JP); Kunihiko Shimamoto, Osaka (JP); Satoshi Hayama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/808,572

(22) Filed: Mar. 4, 2020

(65) Prior Publication Data

US 2020/0288022 A1 Sep. 10, 2020

(30) Foreign Application Priority Data

Mar. 7, 2019 (JP) .............................. JP2019-041202

(51) Int. Cl.
*H04N 1/00* (2006.01)
*G06N 3/04* (2006.01)
(Continued)

(52) U.S. Cl.
CPC ........ *H04N 1/00005* (2013.01); *G06N 3/0445* (2013.01); *G06T 7/0002* (2013.01); *H04N 1/6027* (2013.01); *G06T 2207/20084* (2013.01)

(58) Field of Classification Search
CPC ............. H04N 1/00005; H04N 1/6027; H04N 13/128; H04N 13/261; H04N 19/42; H04N 1/60; H04N 1/603; H04N 1/6072; H04N 5/225; H04N 5/2621; H04N 5/347; H04N 5/374; H04N 5/3745; H04N 5/378; G06N 3/0445; G06T 7/0002; G06T 2207/20084; G06T 5/007; G06T 7/10; G06F 16/583; G06F 16/5866; G06F 8/61; G06F 16/24578; G06F 16/285; G06F 16/35; G06F 16/353; G06F 16/93; G06F 1/1637; G06F 1/1698; G06F 3/14; G06K 2209/17;
(Continued)

(56) References Cited

U.S. PATENT DOCUMENTS

2006/0168178 A1* 7/2006 Hwang ............... H04L 12/2803 709/223
2009/0190187 A1* 7/2009 Cornell ............... H04N 1/00408 358/474
(Continued)

FOREIGN PATENT DOCUMENTS

JP H8-298595 11/1996
JP 2006-256160 9/2006
(Continued)

*Primary Examiner* — Negussie Worku
(74) *Attorney, Agent, or Firm* — Lex IP Meister, PLLC

(57) ABSTRACT

An image forming apparatus analyzes an image by artificial intelligence, determines artificial intelligence image processing as image processing corresponding to the analysis result among plural kinds of image processing, executes the determined artificial intelligence image processing on the image, and executes an output based on the image on which the artificial intelligence image processing is executed.

12 Claims, 16 Drawing Sheets

(51) Int. Cl.
*G06T 7/00* (2017.01)
*H04N 1/60* (2006.01)

(58) Field of Classification Search
CPC ........... G06K 9/00624; G06K 9/00771; G06K 9/6267; G06K 9/0057; G06K 9/46; G06K 9/6288
USPC .......................................................... 358/474
See application file for complete search history.

(56) References Cited

U.S. PATENT DOCUMENTS

| | | | |
|---|---|---|---|
| 2010/0185571 A1* | 7/2010 | Sawada | G06K 9/0057 706/12 |
| 2012/0019586 A1* | 1/2012 | Weng | B41J 3/4071 347/19 |
| 2013/0086245 A1* | 4/2013 | Lu | G06F 1/3212 709/223 |
| 2013/0305322 A1* | 11/2013 | Raleigh | H04W 12/08 726/4 |
| 2014/0047487 A1* | 2/2014 | Guedalia | H04L 67/16 725/80 |
| 2017/0374230 A1* | 12/2017 | Song | H04N 1/00408 |
| 2019/0110020 A1* | 4/2019 | Zhang | H04N 5/23232 |
| 2019/0318170 A1* | 10/2019 | Rokade | H04N 7/181 |
| 2020/0126215 A1* | 4/2020 | Bronkalla | A61B 5/0013 |

FOREIGN PATENT DOCUMENTS

| | | |
|---|---|---|
| JP | 2008-227770 | 9/2008 |
| JP | 2013-236159 | 11/2013 |

* cited by examiner

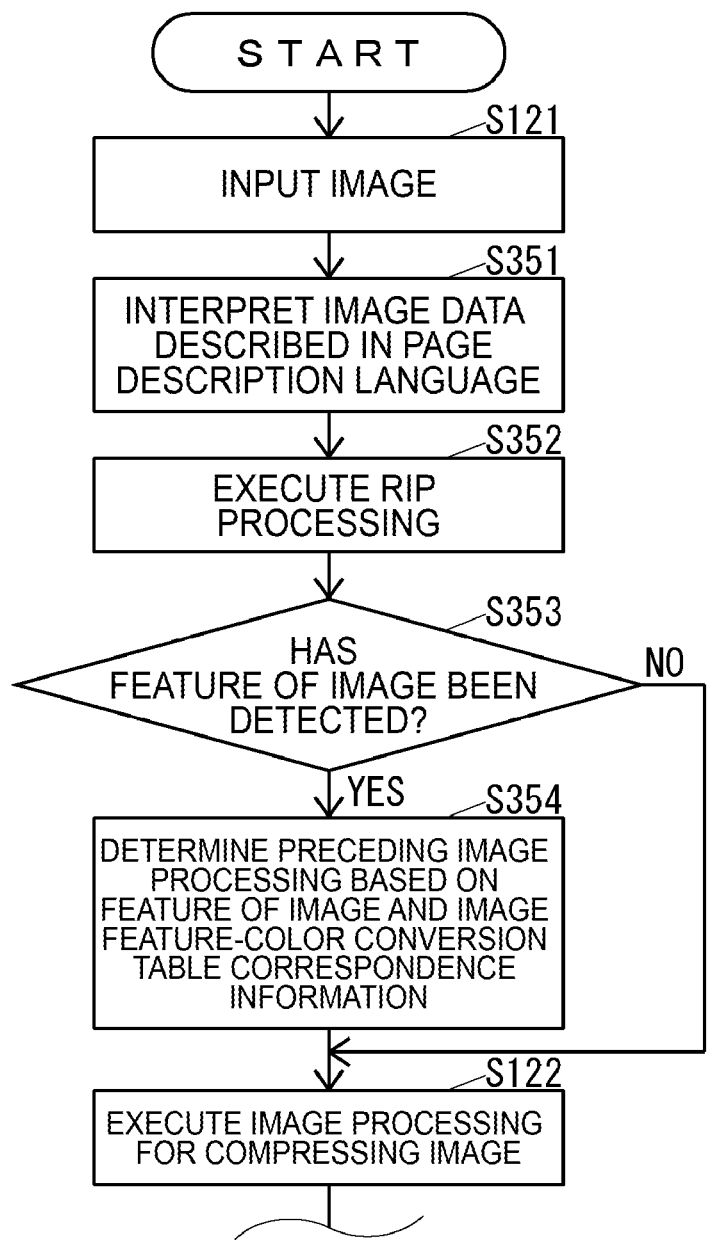

IMAGE FORMING APPARATUS AND NON-TRANSITORY COMPUTER-READABLE RECORDING MEDIUM STORING IMAGE FORMING PROGRAM

INCORPORATION BY REFERENCE

This application is based upon, and claims the benefit of priority from, corresponding Japanese Patent Application No. 2019-041202 filed in the Japan Patent Office on Mar. 7, 2019, the entire contents of which are incorporated herein by reference.

BACKGROUND

Field of the Invention

The present disclosure relates to an image forming apparatus for executing image processing on an image, and a non-transitory computer-readable recording medium storing an image forming program.

Description of Related Art

Conventionally, there has been known an image forming apparatus which executes any one of a plurality of types of image processing on an image and executes an output based on an image on which the image processing is executed.

SUMMARY

An image forming apparatus of the disclosure includes an artificial intelligence image analysis unit configured to analyze an image by artificial intelligence, an artificial intelligence image processing determination unit configured to determine artificial intelligence image processing as image processing corresponding to an analysis result by the artificial intelligence image analysis unit among a plurality of kinds of image processing, an artificial intelligence image processing execution unit configured to execute the artificial intelligence image processing determined by the artificial intelligence image processing determination unit on the image, and an output execution unit configured to execute an output based on the image on which the artificial intelligence image processing is executed.

A non-transitory computer-readable recording medium of the disclosure realizes to an image forming apparatus an artificial intelligence image analysis unit configured to analyze an image by artificial intelligence, an artificial intelligence image processing determination unit configured to determine artificial intelligence image processing as image processing corresponding to an analysis result by the artificial intelligence image analysis unit among a plurality of kinds of image processing, an artificial intelligence image processing execution unit configured to execute the artificial intelligence image processing determined by the artificial intelligence image processing determination unit on the image, and an output execution unit configured to execute an output based on the image on which the artificial intelligence image processing is executed.

BRIEF DESCRIPTION OF THE DRAWINGS

FIG. 17 is a flowchart showing a part of the operation of the image forming apparatus shown in FIG. 15 in the case of executing an output based on an image.

DETAILED DESCRIPTION

Hereinafter, embodiments of the present disclosure will be described with reference to the drawings.

First Embodiment

First, the configuration of an image forming system according to a first embodiment of the present disclosure will be described.

Figure 1:
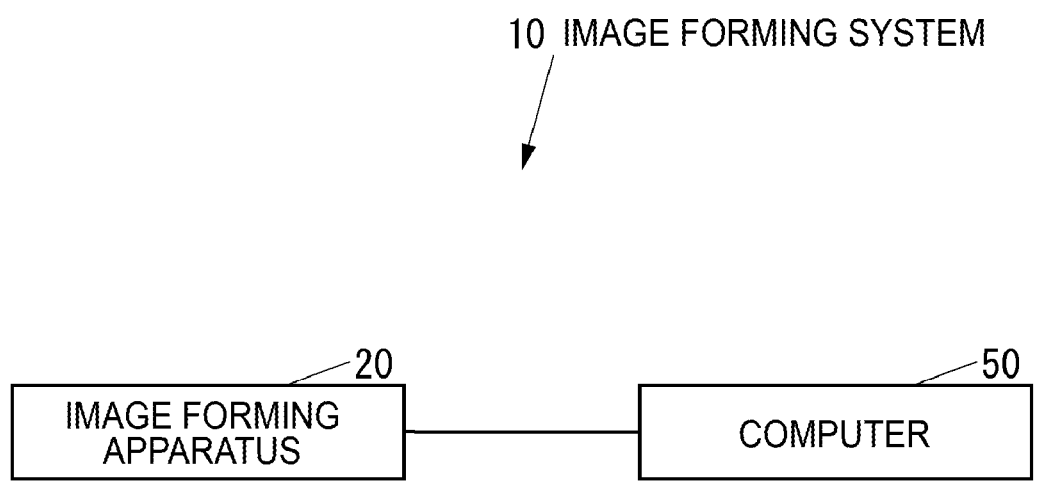
FIG. 1 is a block diagram of an image forming system according to a first embodiment of the present disclosure.

FIG. 1 is a block diagram of an image forming system 10 according to the present embodiment.

As shown in FIG. 1, the image forming system 10 includes an image forming apparatus 20. The image forming apparatus 20 is configured by, for example, a multifunction peripheral (MFP), a printer dedicated machine, a copy dedicated machine, and the like. In addition to the image forming apparatus 20, the image forming system 10 may include at least one image forming apparatus similar to the image forming apparatus 20.

The image forming system 10 includes a computer 50 for transmitting image data to the image forming apparatus in the image forming system 10. The computer 50 is configured by, for example, a personal computer (PC). The image forming system 10 includes at least one computer similar to the computer 50 in addition to the computer 50.

The image forming apparatus in the image forming system 10 and the computer in the image forming system 10 communicate with each other via a network such as a local area network (LAN) and the Internet, or directly via a wired or wireless connection without intervening the network.

Figure 2:
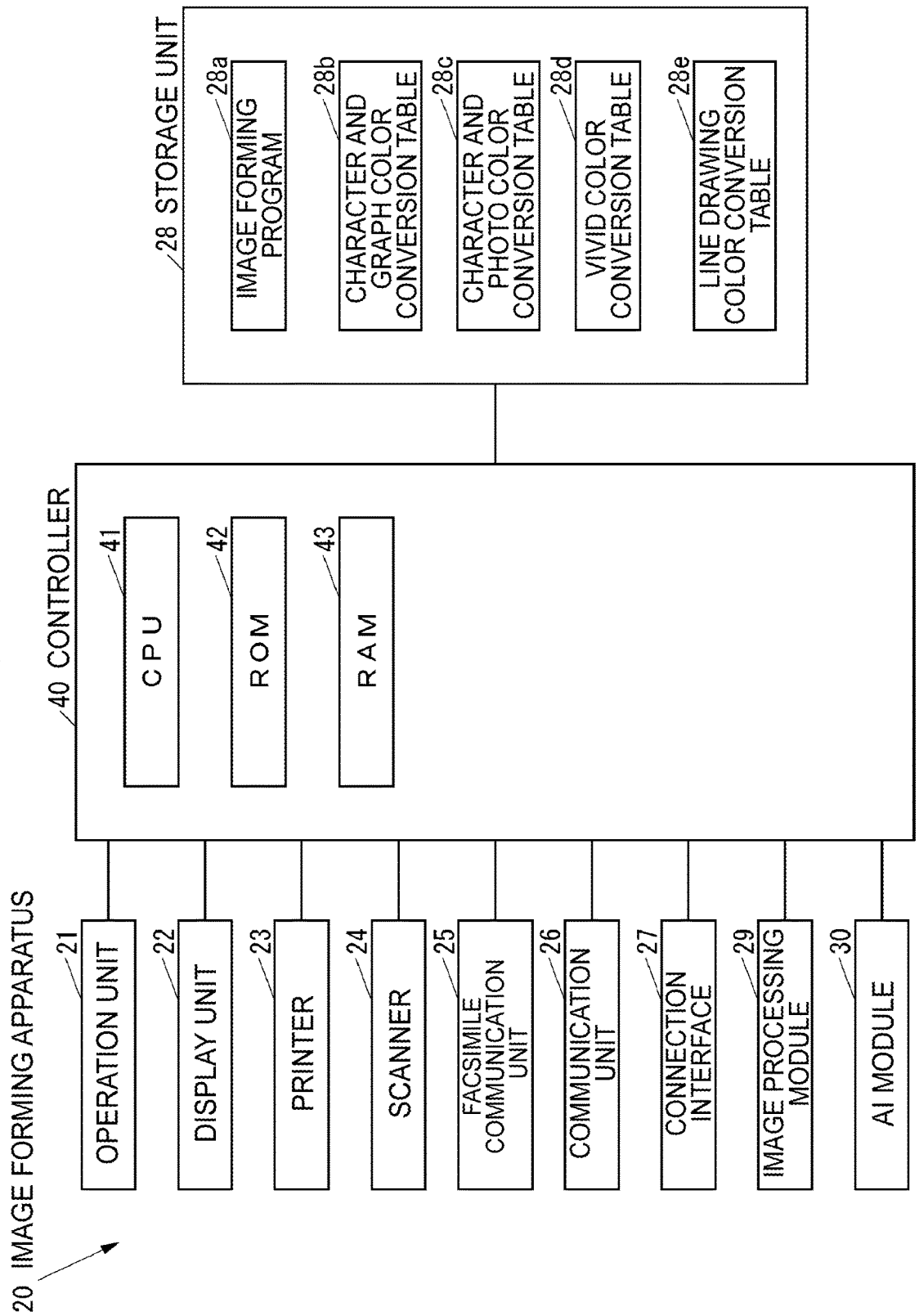
FIG. 2 is a block diagram of an image forming apparatus shown in FIG. 1 in the case of a multifunction peripheral (MFP)

FIG. 2 is a block diagram of the image forming apparatus 20 in the case of the MFP.

As shown in FIG. 2, the image forming apparatus 20 includes an operation unit 21 which is an input device such as a button to which various operations are input, a display unit 22 which is a display device such as a liquid crystal display (LCD) for displaying various information, and a printer 23 which is a printing device which prints an image on a recording medium such as a paper sheet. The image forming apparatus 20 further includes a scanner 24 which is a reading device which reads an image from a document, and a facsimile communication unit 25 which is a facsimile device which executes facsimile communication via a communication line such as a public telephone line with an external facsimile apparatus not shown. The image forming apparatus 20 further includes a communication unit 26 which is a communication device for communicating with an external device via a network such as a LAN and the Internet, or directly via a wired or wireless connection without intervening the network, and a connection interface 27 such as a solid state drive (SSD) port to which an external storage medium such as a universal serial bus (USB) memory is connected. The image forming apparatus 20 further includes a storage unit 28 which is a non-volatile storage device such as an SSD and a hard disk drive (HDD) for storing various kinds of information, an image processing module 29 for executing image processing, an artificial intelligence (AI) module 30 for analyzing an image by artificial intelligence, and a controller 40 for controlling the entire image forming apparatus 20.

The storage unit 28 stores an image forming program 28a for forming an image. The image forming program 28a may be installed in the image forming apparatus 20 at the manufacturing stage of the image forming apparatus 20, additionally from an external storage medium such as a USB memory, or additionally from the network.

The storage unit 28 stores a "character and graph" color conversion table 28b which is a color conversion table suitable for use in an image including both a character and a graph, and a "character and photo" color conversion table 28c which is a color conversion table suitable for use in an image including both a character and a photo. The storage unit 28 further stores a "vivid" color conversion table 28d which is a color conversion table suitable for use in an image of a photo showing a flower, nature and scenery, and a "line drawing" color conversion table 28e which is a color conversion table suitable for use in an image including many line drawings and ruled lines.

The accuracy of image analysis by the AI module 30 is improved by learning.

The controller 40 includes, for example, a central processing unit (CPU) 41, a read only memory (ROM) 42 storing programs and various data, and a random access memory (RAM) 43 which is a memory as a volatile storage device used as a work area for the CPU 41. The CPU 41 executes a program stored in the storage unit 28 or the ROM 42.

Figure 3:
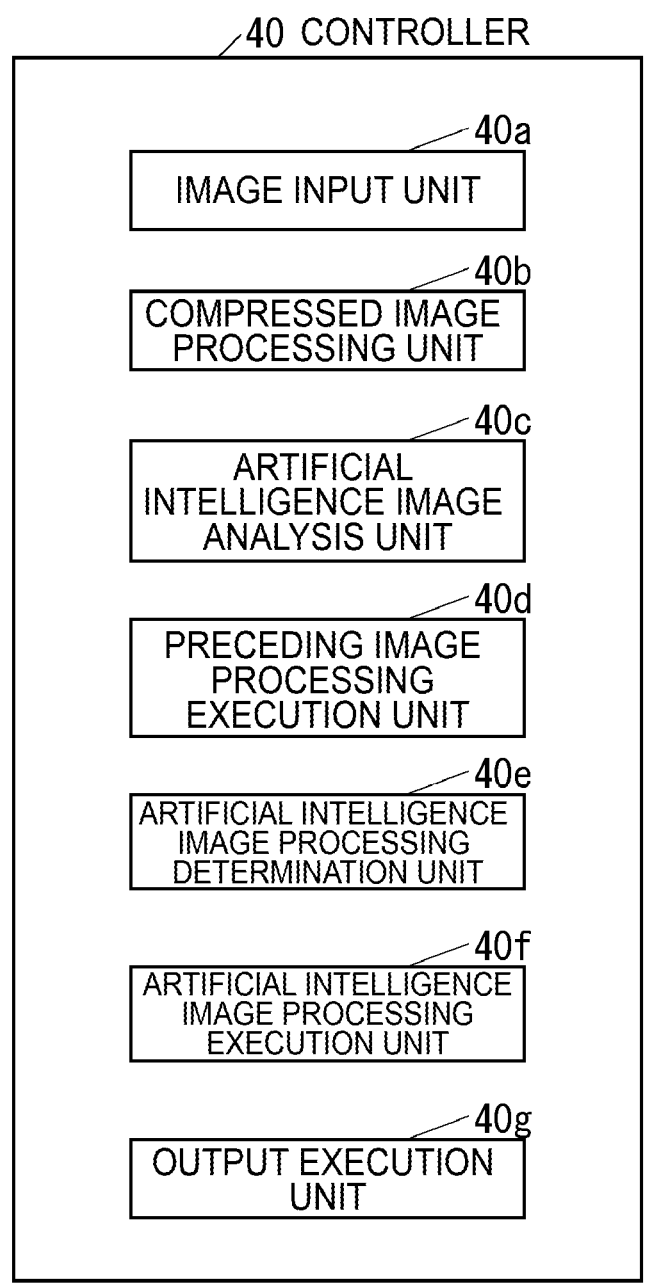
FIG. 3 is a functional block diagram of a control unit shown in FIG. 2.

FIG. 3 is a functional block diagram of the controller 40.

As shown in FIG. 3, the controller 40 includes an image input unit 40a which inputs an image by executing an image forming program 28a, a compressed image processing unit 40b which executes image processing for compressing an image input by the image input unit 40a to store the image in the storage unit 28 or the RAM 43, and an artificial intelligence image analysis unit 40c for analyzing an image by artificial intelligence. The controller 40 further includes a preceding image processing execution unit 40d which executes preceding image processing on an image as image processing executed prior to artificial intelligence image processing as image processing corresponding to the analysis result by the artificial intelligence image analysis unit 40c among a plurality of types of image processing, and an artificial intelligence image processing determination unit 40e which determines artificial intelligence image processing among the plurality of types of image processing. The controller 40 further includes an artificial intelligence image processing execution unit 40f which executes the artificial intelligence image processing determined by the artificial intelligence image processing determination unit 40e on an image, and an output execution unit 40g which executes an output based on the image on which the image processing has been executed.

Figure 4:
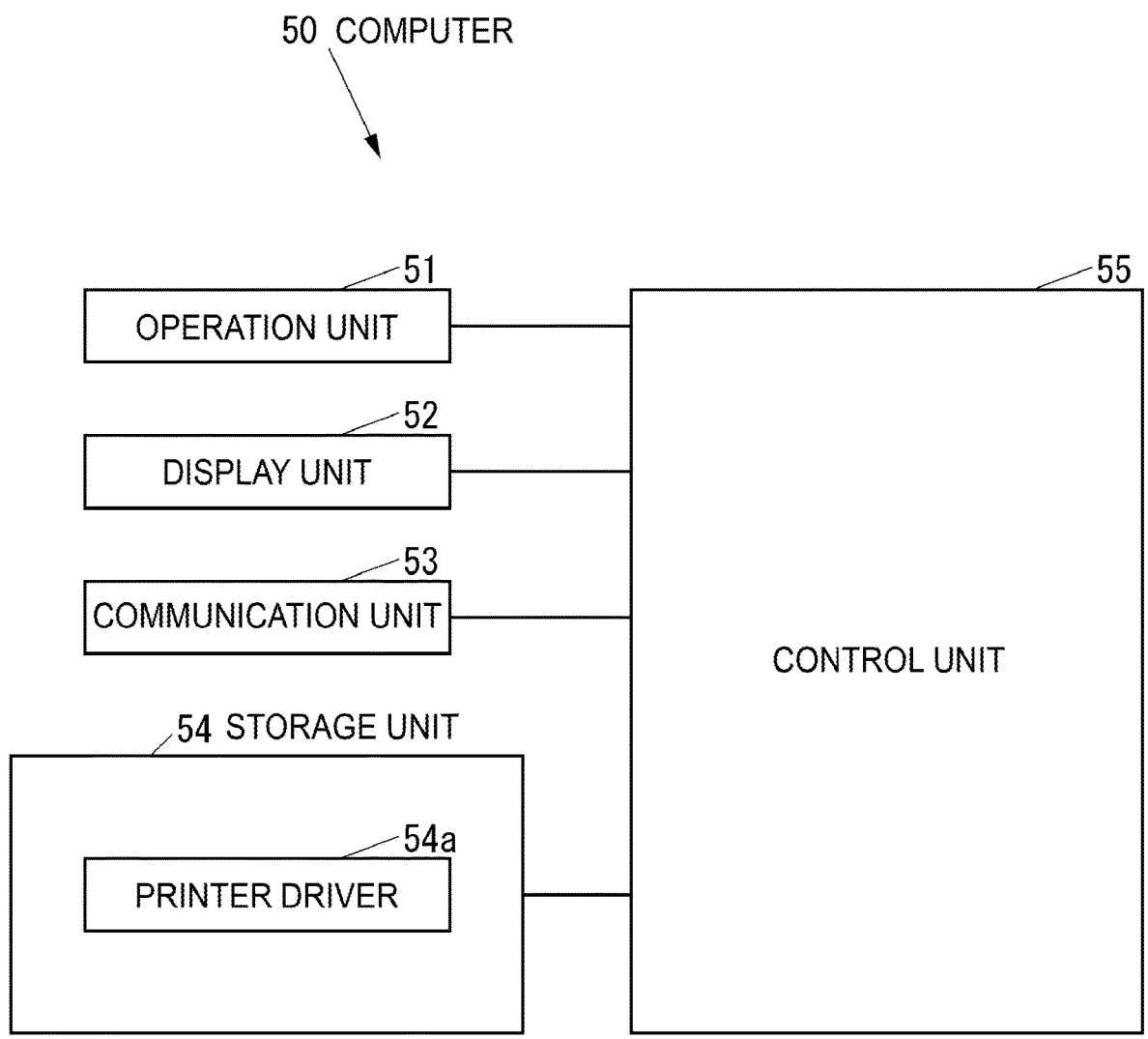
FIG. 4 is a block diagram of a computer shown in FIG. 1.

FIG. 4 is a block diagram of the computer 50.

As shown in FIG. 4, the computer 50 includes an operation unit 51 which is an operation device such as a keyboard and a mouse to which various operations are input, a display unit 52 which is a display device such as an LCD for displaying various kinds of information, and a communication unit 53 which is a communication device which communicates with an external device via a network such as a LAN or the Internet, or directly via a wired or wireless connection without intervening the network. The computer 50 further includes a storage unit 54 which is a non-volatile storage device such as a semiconductor memory and an HDD for storing various kinds of information, and a control unit 55 which controls the entire computer 50.

The storage unit 54 stores a printer driver 54a for transmitting image data to the image forming apparatus. The printer driver 54a may be installed in the computer 50 at the manufacturing stage of the computer 50, additionally from an external storage medium such as a compact disk (CD), a digital versatile disk (DVD) and a USB memory, or additionally from the network.

The control unit 55 includes, for example, a CPU, a ROM storing a program and various data, and a RAM serving as a memory used as a work area for the CPU in the control unit 55. The CPU in the control unit 55 executes a program stored in the storage unit 54 or the ROM in the control unit 55.

Next, the operation of the image forming system 10 will be described.

First, the operation of the computer 50 when transmitting image data to the image forming apparatus 20 will be described.

Figure 5:
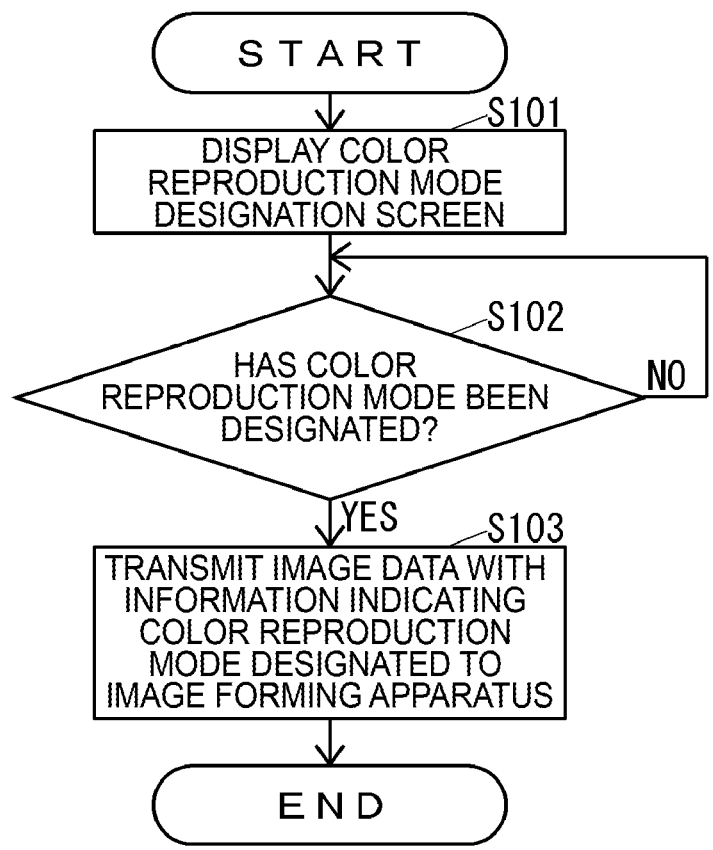
FIG. 5 is a flowchart of the operation of the computer shown in FIG. 4 when transmitting image data to the image forming apparatus.

FIG. 5 is a flowchart of the operation of the computer 50 when transmitting image data to the image forming apparatus 20.

When transmitting image data to the image forming apparatus 20, the control unit 55 in the computer 50 executes the printer driver 54a to execute the operation shown in FIG. 5.

As shown in FIG. 5, the control unit 55 displays a screen for designating a color reproduction mode in the image forming apparatus 20 (hereinafter referred to as "color reproduction mode designation screen") on the display unit 52 (S101). Here, the color reproduction mode which is designated on the color reproduction mode designation screen includes a "character and graph" color reproduction mode which is a color reproduction mode suitable for an image including both a character and a graph, a "character and photo" color reproduction mode which is a color reproduction mode suitable for an image including both a character and a photo. The color reproduction mode further includes a "vivid" color reproduction mode which is a color reproduction mode suitable for a photographic image showing a flower, nature, and scenery, a "line drawing" color reproduction mode which is a color reproduction mode suitable for an image which includes many line drawings and ruled lines, and an "automatic" color reproduction mode which is a color reproduction mode in which the image forming apparatus 20 automatically selects an appropriate color conversion table for an image.

The control unit 55 determines whether the color reproduction mode has been designated on the color reproduction mode designation screen until the control unit 55 determines that the color reproduction mode has been designated on the color reproduction mode designation screen after the processing of S101 (S102).

When the control unit 55 determines in S102 that the color reproduction mode has been designated on the color reproduction mode designation screen, the control unit 55 transmits image data together with information indicating the color reproduction mode designated on the color reproduction mode designation screen to the image forming apparatus 20 (S103), and then ends the operation shown in FIG. 5.

Next, the operation of the image forming apparatus 20 when executing an output based on an image will be described.

Figure 6:
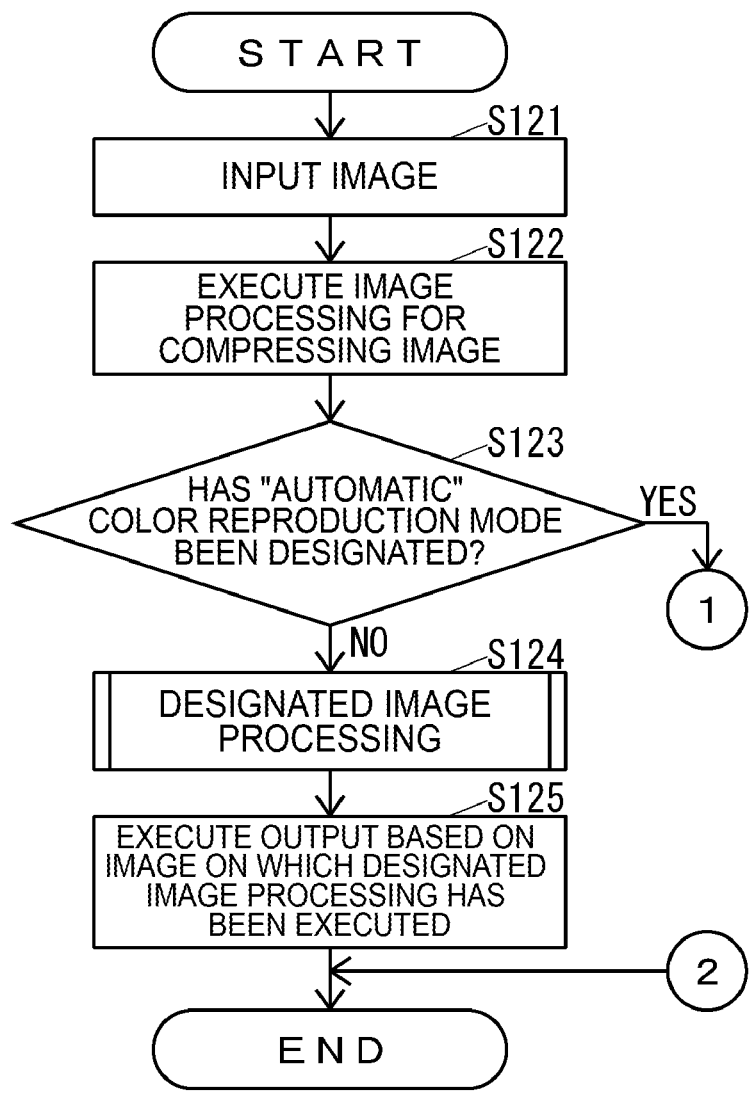
FIG. 6 is a flowchart showing a part of the operation of the image forming apparatus shown in FIG. 2 when executing an output based on an image.
Figure 7:
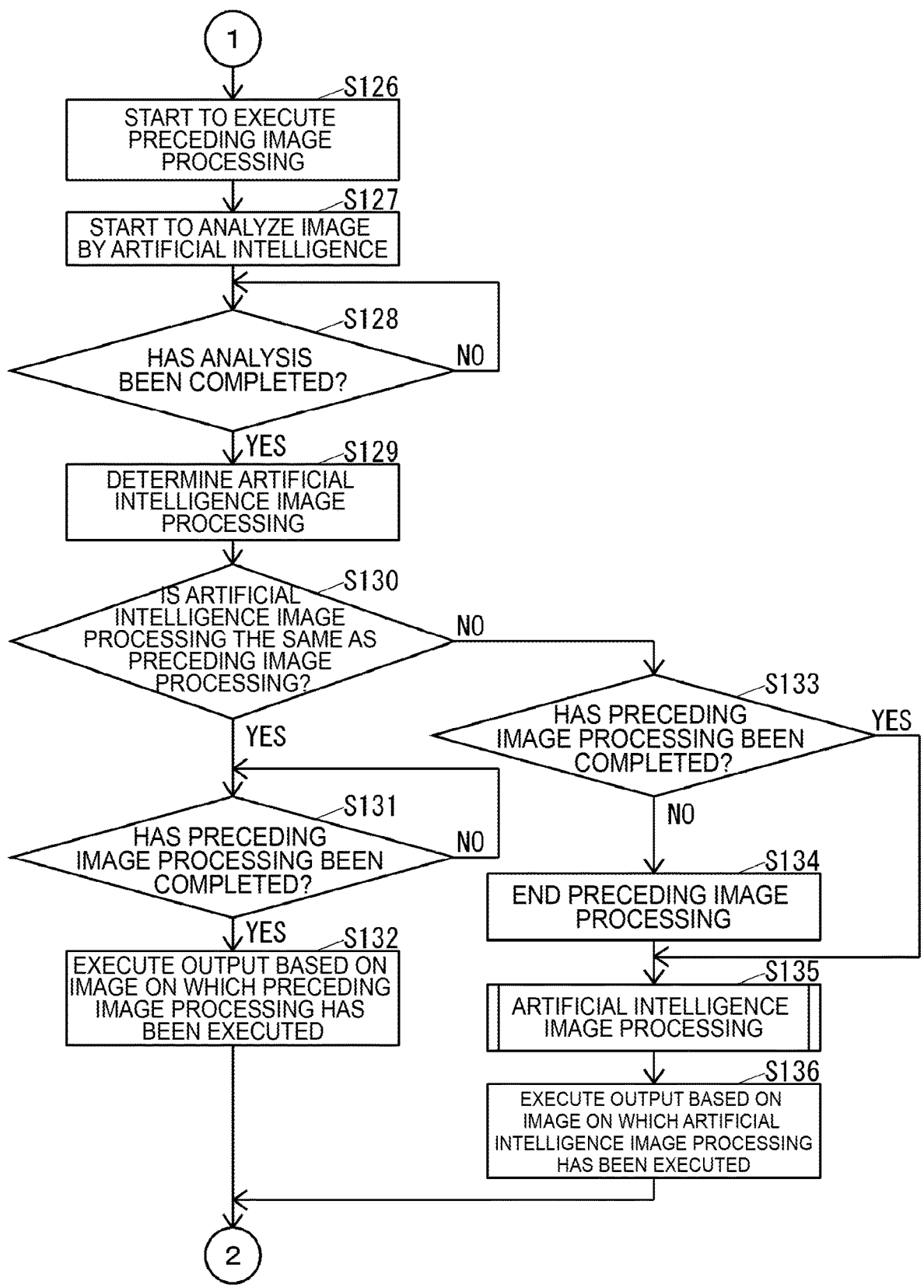
FIG. 7 is a flowchart following the flowchart shown in FIG. 6.

FIGS. 6 and 7 are flowcharts showing the operations of the image forming apparatus 20 when executing an output based on an image.

When the controller 40 in the image forming apparatus 20 is transmitted the image data together with the information indicating the color reproduction mode from the computer 50, the controller 40 executes the operations shown in FIGS. 6 and 7. Further, when the controller 40 is instructed via the operation unit 21 to output based on an image read from a document by the scanner 24 or image data stored in an external storage medium connected to the connection interface 27, the controller 40 executes the operations shown in FIGS. 6 and 7. Note that when the controller 40 is instructed via the operation unit 21 to output based on the image read from the document by the scanner 24 or the image data stored in the external storage medium connected to the connection interface 27, the color reproduction mode in the image forming apparatus 20 is designated to the controller 40 via the operation unit 21.

As shown in FIGS. 6 and 7, the image input unit 40a receives an image (S121). Here, the image input in step S121 is an image transmitted from the computer 50, an image read from a document by the scanner 24, or an image stored in an external storage medium connected to the connection interface 27.

The compressed image processing unit 40b executes image processing for compressing the image input in S121 after the processing of S121 (S122). Note that the compressed image processing unit 40b stores the image compressed in S122 in the RAM 43 in the case of an operation requiring performance such as first print or first copy. When such performance is not required, the compressed image processing unit 40b stores the image compressed in S122 in the storage unit 28.

The preceding image processing execution unit 40d determines whether the designated color reproduction mode is the "automatic" color reproduction mode (S123).

When the preceding image processing execution unit 40d determines in S123 that the designated color reproduction mode is not the "automatic" color reproduction mode, the preceding image processing execution unit 40d executes image processing using the color conversion table corresponding to the designated color reproduction mode for the image compressed in S122 (hereinafter referred to as "designated image processing") (S124). Here, when the image compressed in S122 is stored in the RAM 43, the preceding image processing execution unit 40d executes the designated image processing on the image stored in the RAM 43. When the image compressed in S122 is stored in the storage unit 28, the preceding image processing execution unit 40d loads the image stored in the storage unit 28 into the RAM 43, and then executes the designated image processing for the image loaded in the RAM 43.

Figure 8:
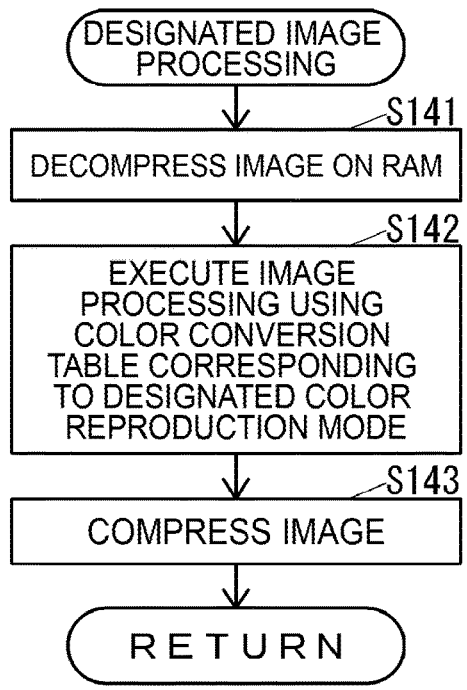
FIG. 8 is a flowchart of designated image processing shown in FIGS. 6 and 7.

FIG. 8 is a flowchart of the designated image processing in S124.

As shown in FIG. 8, the preceding image processing execution unit 40d decompresses the image on the RAM 43 (S141).

Next, the preceding image processing execution unit 40d executes image processing using the color conversion table corresponding to the designated color reproduction mode on the image decompressed in S141 by the image processing module 29 (S142). Here, the color conversion table corresponding to the designated color reproduction mode is the "character and graph" color conversion table 28b when the "character and graph" color reproduction mode is designated, and is the "character and photo" color conversion table 28c when the "character and photo" color reproduction mode is designated. Further, the color conversion table is the "vivid" color conversion table 28d when the "vivid" color reproduction mode is designated, and is the "line drawing" color conversion table 28e when the "line drawing" color reproduction mode is designated.

After the processing of S142, the preceding image processing execution unit 40d compresses the image that has been subjected to the image process in S142 (S143), and then ends the operation shown in FIG. 8.

As shown in FIGS. 6 and 7, the output execution unit 40g executes an output based on the image on which the designated image processing in S124 has been executed after the processing of S124 (S125). For example, the type of the output in S125 is printing on a recording medium by the printer 23, transmission via the communication unit 26, or the like. The type of the output in S125 may be set in advance according to the type of the input in S121, or may be instructed via the operation unit 21 or the communication unit 26 before the processing of S121.

When the output execution unit 40g completes the processing of S125, the output execution unit 40g ends the operations shown in FIGS. 6 and 7.

When the preceding image processing execution unit 40d determines in S123 that the designated color reproduction mode is the "automatic" color reproduction mode, the preceding image processing execution unit 40d starts to execute the preceding image processing on the image compressed in S122 (S126). Here, when the image compressed in S122 is stored in the RAM 43, the preceding image processing execution unit 40d starts to execute the preceding image processing on the image stored in the RAM 43. Furthermore, when the image compressed in S122 is stored in the storage unit 28, the preceding image processing execution unit 40d loads the image stored in the storage unit 28 into the RAM 43, and then starts to execute the preceding image processing on the image loaded in the RAM 43.

Figure 9:
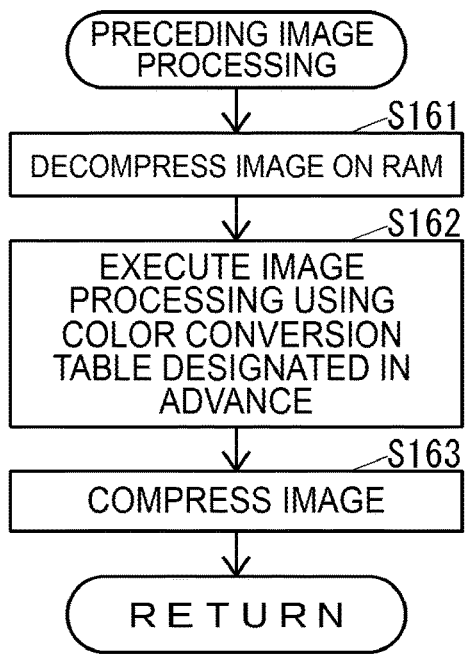
FIG. 9 is a flowchart of preceding image processing started in the operation shown in FIGS. 6 and 7.

FIG. 9 is a flowchart of the preceding image processing started in S126.

As shown in FIG. 9, the preceding image processing execution unit 40d decompresses the image on the RAM 43 (S161).

Then, the preceding image processing execution unit 40d executes image processing using the color conversion table set in advance on the image decompressed in S161 by the image processing module 29 (S162). For example, the color conversion table set in advance may be a default color conversion table of the image forming apparatus 20 set by default among the "character and graph" color conversion table 28b, the "character and photo" color conversion table 28c, the "vivid" color conversion table 28d, and the "line drawing" color conversion table 28e. Further, the color conversion table may be a color conversion table designated in advance by the user or may be the same color conversion table as the color conversion table applied to the document, which was targeted immediately before the current target document, among the tables 28b, 28c, 28d and 28e. Further, the color conversion table may be the same color conversion table as the color conversion table applied to the page targeted immediately before the current target page, or may be the same color conversion table as the color conversion table used frequently, among the tables 28b, 28c, 28d and 28e. The preceding image processing execution unit 40d stores the usage history of the color conversion table, thereby making it possible to determine the color conversion table used frequently, based on the usage history of the color conversion table. When the same color conversion table as the color conversion table used frequently is adopted as the color conversion table set in advance, the preceding image processing execution unit 40d may determine the color conversion table frequently used for each user, for example.

After the processing of S162, the preceding image processing execution unit 40d compresses the image for which the image processing has been executed in S162 (S163), and then ends the operation shown in FIG. 9.

As shown in FIGS. 6 and 7, the artificial intelligence image analysis unit 40c starts the artificial intelligence analysis of the image compressed in S122 by using the AI module 30, after the processing of S126 (S127). Here, when the image compressed in S122 is stored in the RAM 43, the artificial intelligence image analysis unit 40c starts the artificial intelligence analysis of the image stored in the RAM 43. When the image compressed in S122 is stored in the storage unit 28, the artificial intelligence image analysis unit 40c loads the image stored in the storage unit 28 into the RAM 43, and then starts the artificial intelligence analysis of the image loaded into the RAM 43.

In the operations shown in FIGS. 6 and 7, the processing of S126 is executed before the processing of S127, but the processing of S127 may be executed before the processing of S126.

After the processing of S127, the artificial intelligence image analysis unit 40c determines whether the analysis started in S127 has been completed until the artificial intelligence image analysis unit 40c determines that the analysis started in S127 has been completed. (S128).

When the artificial intelligence image analysis unit 40c determines in S128 that the analysis started in S127 has been completed, the artificial intelligence image processing determination unit 40e determines the artificial intelligence image processing corresponding to the analysis result of the analysis determined to have completed in S128 among the plurality of types of image processing (S129). For example, when it is analyzed in S122 that the image compressed is an image including both a character and a graph, the artificial intelligence image processing determination unit 40e may determine the image processing using the "character and graph" color conversion table 28b as the artificial intelligence image processing. When it is analyzed in S122 that the image compressed is an image including both a character and a photo, the artificial intelligence image processing determination unit 40e may determine the image processing using the "character and photo" color conversion table 28c as the artificial intelligence image processing. When it is analyzed in S122 that the image compressed is a photographic image showing a flower, nature, and scenery, the artificial intelligence image processing determination unit 40e may determine the image processing using the "vivid" color conversion table 28d as the artificial intelligence image processing. When it is analyzed in S122 that the image compressed is an image including many line drawings and ruled lines, the artificial intelligence image processing determination unit 40e may determine the image processing using the "line drawing" color conversion table 28e as the artificial intelligence image processing.

After the processing of S129, the artificial intelligence image processing determination unit 40e determines whether the artificial intelligence image processing determined in S129 is the same as the preceding image processing started in S126 (S130). That is, when the artificial intelligence image processing determined in S129 and the preceding image processing started in S126 are the image processing using the same color conversion table, the artificial intelligence image processing determination unit 40e determines that the artificial intelligence image processing determined in S129 and the preceding image processing started in S126 are the same. Further, when the artificial intelligence image processing determined in S129 and the preceding image processing started in S126 are image processing using different color conversion tables, the artificial intelligence image processing determination unit 40e determines that the artificial intelligence image processing determined in S129 is not the same as the preceding image processing started in S126.

When the artificial intelligence image processing determination unit 40e determines in S130 that the artificial intelligence image processing determined in S129 is the same as the preceding image processing started in S126, the preceding image processing execution unit 40d determines whether the preceding image processing started in S126 has been completed until the preceding image processing execution unit 40d determines that the preceding image processing started in S126 has been completed (S131).

When the preceding image processing execution unit 40d determines in S131 that the preceding image processing started in S126 has been completed, the output execution unit 40g executes an output based on the image on which the preceding image processing determined to have been completed in S131 has been executed (S132). For example, the type of the output in S132 is printing on a recording medium by the printer 23, transmission via the communication unit 26, and the like. The type of the output in S132 may be set in advance according to the type of the input in S121, or may be instructed via the operation unit 21 or the communication unit 26 before the processing of S121.

When the output execution unit 40g completes the processing of S132, the output execution unit 40g ends the operations shown in FIGS. 6 and 7.

When the artificial intelligence image processing determination unit 40e determines in S130 that the artificial intelligence image processing determined in S129 is not the same as the preceding image processing started in S126, the artificial intelligence image processing execution unit 40f determines whether the preceding image processing started in S126 has been completed (S133).

When the artificial intelligence image processing execution unit 40f determines in S133 that the preceding image processing started in S126 has not been completed, the artificial intelligence image processing execution unit 40f ends the preceding image processing started in S126 (S134).

When the artificial intelligence image processing execution unit 40f determines in S133 that the preceding image processing started in S126 has been completed, or executes the processing of S134, the artificial intelligence image processing execution unit 40f executes the artificial intelligence image processing determined in S129 (S135). Here, when the image compressed in S122 is stored in the RAM 43, the artificial intelligence image processing execution unit 40f executes the artificial intelligence image processing on the image stored in the RAM 43. Further, when the image compressed in S122 is stored in the storage unit 28, the artificial intelligence image processing execution unit 40f executes the artificial intelligence image processing on the image loaded in the RAM 43 in S126.

Figure 10:
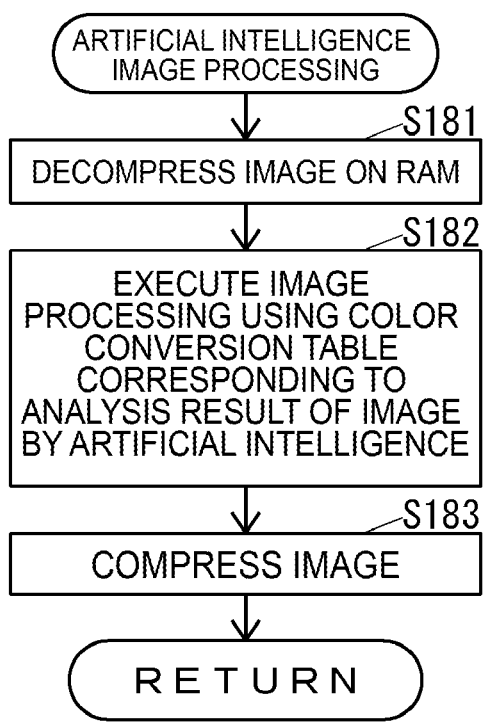
FIG. 10 is a flowchart of artificial intelligence image processing shown in FIGS. 6 and 7.

FIG. 10 is a flowchart of the artificial intelligence image processing in S135.

As shown in FIG. 10, the artificial intelligence image processing execution unit 40f decompresses the image on the RAM 43 (S181).

Then, the artificial intelligence image processing execution unit 40f executes image processing using the color conversion table determined in S129, that is, the color conversion table corresponding to the analysis result of the image by the artificial intelligence on the image decompressed in S181 by using the image processing module 29 (S182).

After the processing of S182, the artificial intelligence image processing execution unit 40f compresses the image subjected to the image processing of S182 (S183), and then ends the operation shown in FIG. 10.

As shown in FIGS. 6 and 7, the output execution unit 40g executes an output based on the image on which the artificial intelligence image processing of S135 has been executed after the processing of S135 (S136). For example, the type of the output in S136 is printing on a recording medium by the printer 23, transmission via the communication unit 26, and the like. The type of the output in S136 may be set in advance according to the type of the input in S121, or may be instructed via the operation unit 21 or the communication unit 26 before the processing of S121.

when the output execution unit 40g completes the processing of S136, the output execution unit 40g ends the operations shown in FIGS. 6 and 7.

As described above, the image forming apparatus 20 executes on the image the artificial intelligence image processing as the image processing corresponding to the analysis result of the image by the artificial intelligence among the plurality of types of image processing (S135), and then executes the output based on the image on which the artificial intelligence image processing has been executed (S136). Accordingly, the possibility of executing an output based on an image on which appropriate image processing has been executed is improved, and as a result, the image forming apparatus 20 improves the quality of the output provided to the user.

The image forming apparatus 20 executes the preceding image processing prior to the artificial intelligence image processing (S126), and executes an output based on the image on which the preceding image processing has been executed, not the image on which the artificial intelligence image processing has been executed (S132) when the artificial intelligence image processing is the same as the preceding image processing (YES in S130). Therefore, the image forming apparatus 20 shortens the time from when the image is input until the output based on the image is executed.

Figure 11:
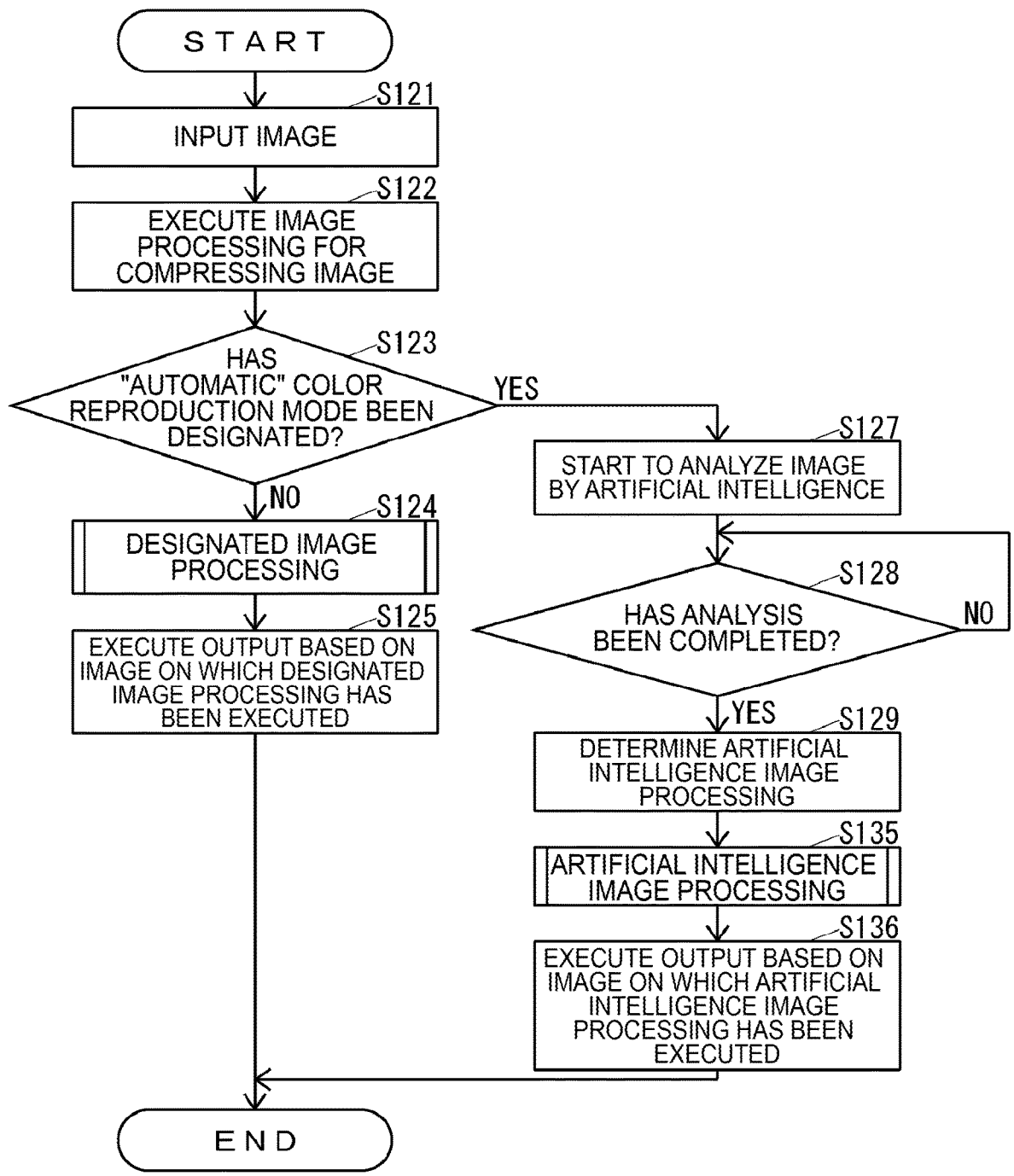
FIG. 11 is a flowchart of an example of the operation of the image forming apparatus in the case of executing an output based on an image, which is different from the example shown in FIGS. 6 and 7.

Note that the image forming apparatus 20 may execute the operation that does not execute the preceding image processing, as shown in FIG. 11, instead of the operations shown in FIGS. 6 and 7. Here, it takes a very long time to analyze an image by the artificial intelligence started in S127, even when analyzing one image, even if the AI module 30 independent of the controller 40 is used. When executing the operation shown in FIG. 11, the image forming apparatus 20 surely executes the artificial intelligence image processing after the image analysis by the artificial intelligence started in S127 is completed (S135). Therefore, compared to the case where the operations shown in FIGS. 6 and 7 are executed, there is a possibility that the time from when the image is input until the output based on the image is executed may be longer.

The image forming apparatus 20 loads an image from the storage unit 28, which is the non-volatile storage device, to the RAM 43, which is the volatile storage device, and then executes the preceding image processing on the image loaded to the RAM 43 (S126). Subsequently, when the artificial intelligence image processing is not the same as the preceding image processing (NO in S130), the image forming apparatus 20 starts to execute the artificial intelligence image processing on the image loaded in the RAM 43 (S135), and then executes the output based on the image on which the artificial intelligence image processing has been executed (S136). Therefore, it is not necessary to newly load an image from the storage unit 28 to the RAM 43 when executing the artificial intelligence image processing. As a result, after it is determined that the artificial intelligence image processing is not the same as the preceding image processing, the image forming apparatus 20 reduces the time until the execution of the artificial intelligence image processing is started on the image.

The image analysis according to the artificial intelligence described in the present embodiment is an example. The image forming apparatus 20 analyzes an image from various viewpoints such as a character, an image, a photo, a blank sheet, a background, a landscape, a person, a form (ruled line), a handwritten character and a mark.

The color conversion table and the color reproduction mode described in the present embodiment are examples. The image forming apparatus 20 may employ a color conversion table and a color reproduction mode different from the color conversion table and the color reproduction mode described in the present embodiment.

Although the image forming apparatus 20 includes the image processing module 29 separately from the controller 40 in the present embodiment, the function of the image processing module 29 may be realized by the controller 40.

Although the image forming apparatus 20 includes the AI module 30 separately from the controller 40 in the present embodiment, the function of the AI module 30 may be realized by the controller 40.

Second Embodiment

First, the configuration of an image forming system according to a second embodiment of the present disclosure will be described.

The configuration of the image forming system according to the present embodiment is the same as the configuration of the image forming system 10 according to the first embodiment (see FIG. 1), except for the points described below. The same reference numerals are provided to the same elements of the image forming system according to the present embodiment as the elements of the image forming system 10. Therefore, the detailed description thereof is thus omitted.

Figure 12:
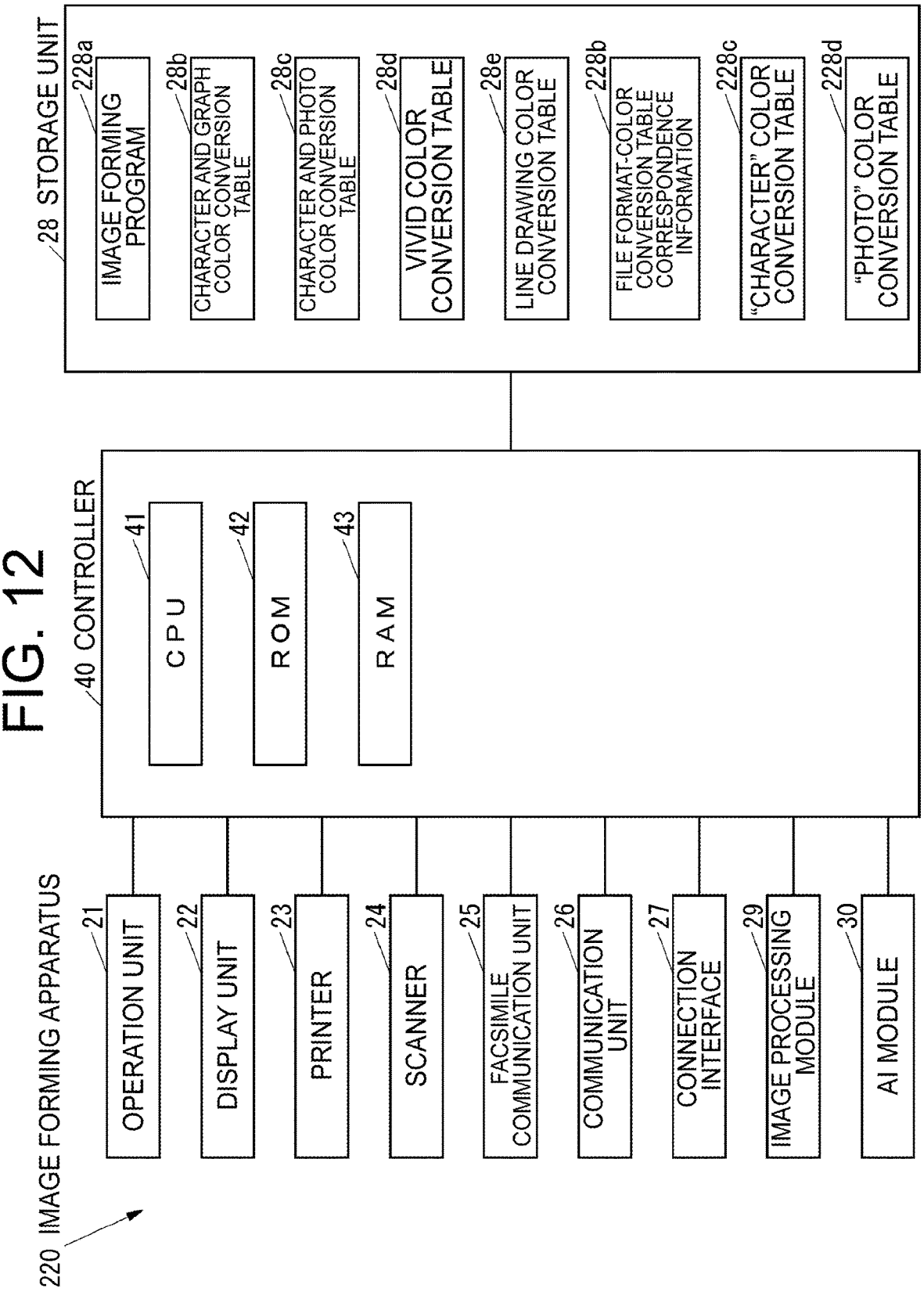
FIG. 12 is a block diagram of an image forming apparatus in an image forming system according to a second embodiment of the present disclosure.

FIG. 12 is a block diagram of an image forming apparatus 220 in an image forming system according to the present embodiment.

The configuration of the image forming system according to the present embodiment is the same as the configuration in which the image forming system 10 (see FIG. 1) includes the image forming apparatus 220 shown in FIG. 12 instead of the image forming apparatus 20 (see FIG. 2).

In the configuration of the image forming apparatus 220, the image forming apparatus 20 includes an image forming program 228a instead of the image forming program 28a (see FIG. 2). Further, the configuration of the image forming apparatus 220 is the same as the configuration included in the image forming apparatus 20, which includes a file format-color conversion table correspondence information 228b indicating the correspondence between the file format and the color conversion table, a "character" color conversion table 228c which is a color conversion table suitable for being used for an image including only a character, and a "photo" color conversion table 228d which is a color conversion table suitable for being used for an image including only a photo.

For example, the file format-color conversion table correspondence information 228b associates a txt related file having an extension such as "txt", and a doc-type Office related file having an extension such as "doc" with the "character" color conversion table 228c. The file format-color conversion table correspondence information 228b further associates an image related file having an extension such as "png", "jpg" and "gif" with the "photo" color conversion table 228d. The file format-color conversion table correspondence information 228b further associates a ppt-type Office related file having an extension such as "ppt" with the "character and graph" color conversion table 28b. The file format-color conversion table correspondence information 228b further associates a pdf related file having an extension such as "pdf", an xps related file having an extension such as "xps", and a web page file having an extension such as "htm" and "html" with the "character and photo" color conversion table 28c. The file format-color conversion table correspondence information 228b further associates an xls-type Office related file having an extension such as "xls" with the "line drawing" color conversion table 28e.

Figure 13:
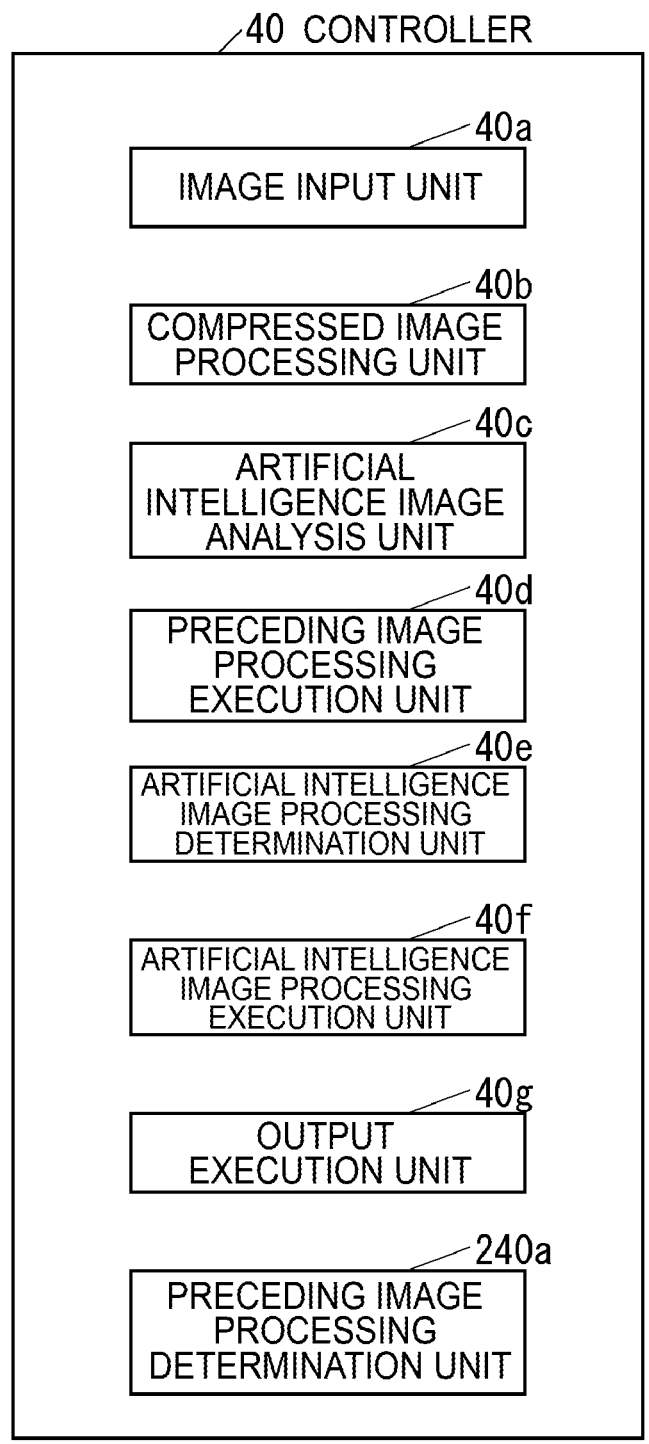
FIG. 13 is a functional block diagram of the image forming apparatus shown in FIG. 12.

FIG. 13 is a functional block diagram of the image forming apparatus 220.

As shown in FIG. 13, the controller 40 executes the image forming program 228a (see FIG. 12), to realize an image input unit 40a, a compressed image processing unit 40b, an artificial intelligence image analysis unit 40c, a preceding image processing execution unit 40d, an artificial intelligence image processing determination unit 40e, an artificial intelligence image processing execution unit 40f, an output execution unit 40g, and a preceding image processing determination unit 240a that determines preceding image processing to be executed by the preceding image processing execution unit 40d.

Next, the operation of the image forming system according to the present embodiment will be described.

The operation of the image forming system according to the present embodiment is the same as that of the image forming system 10 according to the first embodiment (see FIG. 1), except for the points described below.

In the present embodiment, it is assumed that the image input in S121 is either an image transmitted from the computer 50 or an image stored in an external storage medium connected to the connection interface 27.

Figure 14:
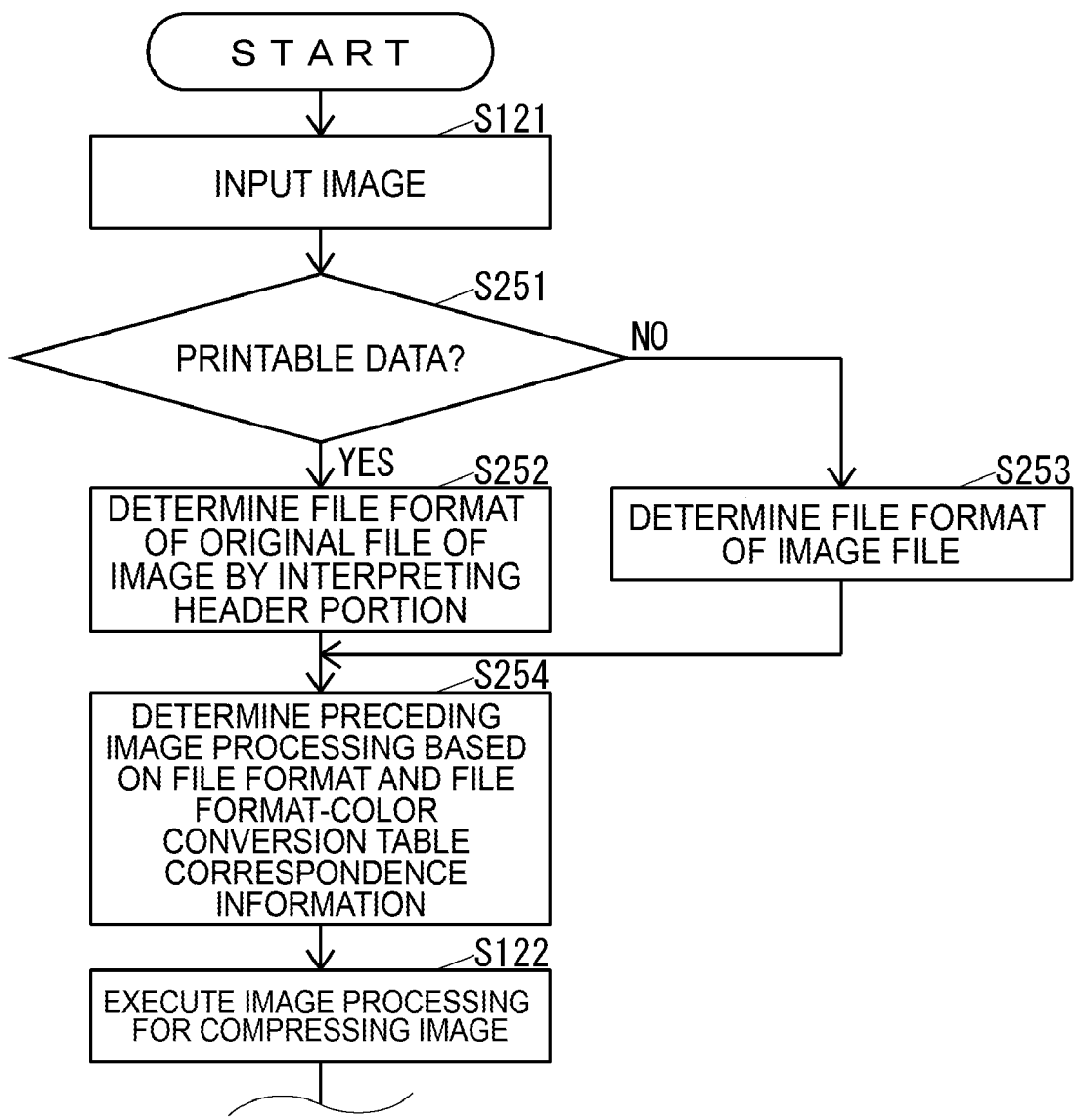
FIG. 14 is a flowchart showing a part of the operation of the image forming apparatus shown in FIG. 12 in the case of executing an output based on an image.

FIG. 14 is a flowchart showing a part of the operation of the image forming apparatus 220 when executing an output based on an image.

As shown in FIG. 14, when executing an output based on an image, the image forming apparatus 220 executes the processing of S251 to S254 between the processing of S121 and the processing of S122.

After the processing of S121, the preceding image processing determination unit 240a determines whether the image data input in S121 is printable data (S251).

When the preceding image processing determination unit 240a determines in S251 that the image data input in S121 is printable data, the preceding image processing determination unit 240a interprets the header portion of the printable data input in S121, and determines the file format of the original file of the image (S252).

When the preceding image processing determination unit 240a determines in S251 that the image data input in S121 is not printable data, the preceding image processing determination unit 240a determines the file format of the image file based on the fact that the image data input in S121 is a file (S253).

After the processing of S252 or S253, the preceding image processing determination unit 240a determines the preceding image processing based on the file format determined in S252 or S253 and the file format-color conversion table correspondence information 228b (S254). For example, when the file format determined in S252 or S253 is the txt related file having the extension such as "txt" or the doc-type Office related file having the extension such as "doc", the preceding image processing determination unit 240a determines the image processing using the "character" color conversion table 228c as the preceding image processing. Furthermore, when the file format determined in S252 or S253 is the image related file having the extension such as "png", "jpg" and "gif", the preceding image processing determination unit 240a determines the image processing using the "photo" color conversion table 228d as the preceding image processing. Furthermore, when the file format determined in S252 or S253 is the ppt-type Office related file having the extension such as "ppt", the preceding image processing determination unit 240a determines the image processing using the "character and graph" color conversion table 28b as the preceding image processing. Furthermore, when the file format determined in S252 or S253 is the pdf related file having the extension such as "pdf", the xps related file having the extension such as "xps", or the Web page file having the extension such as "htm" and "html", the preceding image processing determination unit 240a determines the image processing using the "character and photo" color conversion table 28c as the preceding image processing. Furthermore, when the file format determined in S252 or S253 is the xls-type Office related file having the extension such as "xls", the preceding image processing determination unit 240a determines the image processing using the "line drawing" color conversion table 28e as the preceding image processing.

The compressed image processing unit 40b executes the processing of S122 when the processing of S254 is completed.

The preceding image processing execution unit 40d executes the preceding image processing determined in S254 in S162 (see FIG. 9).

It should be noted that the processing of S254 may be executed between the processing of S122 and the processing of S123 (see FIG. 6), or may be executed between the processing of S123 and the processing of S126 (see FIG. 7).

As described above, when the image is input as a file (NO in S251), the image forming apparatus 220 determines the preceding image processing based on the file format of the file (S253 and S254). Therefore, it is possible to improve the possibility that the artificial intelligence image processing is the same as the preceding image processing. As a result, the image forming apparatus 220 shortens the time from when the image is input in S121 to when the output based on the image is executed.

When an image is input as printable data (YES in S251), the image forming apparatus 220 determines the file format of the original file of the image based on the printable data (S252), and then determines the preceding image processing based on the determined file format (S254). Therefore, the image forming apparatus 220 improves the possibility that the artificial intelligence image processing is the same as the preceding image processing. As a result, the image forming apparatus 220 shortens the time from when the image is input in S121 to when the output based on the image is executed.

Third Embodiment

First, the configuration of an image forming system according to a third embodiment of the present disclosure will be described.

The configuration of the image forming system according to the present embodiment is the same as the configuration of the image forming system 10 according to the first embodiment (see FIG. 1), except for the points described below. The same reference numerals are provided to the same elements of the image forming system 10 according to the present embodiment as the elements of the image forming system 10. Therefore, the detailed description thereof is thus omitted.

Figure 15:
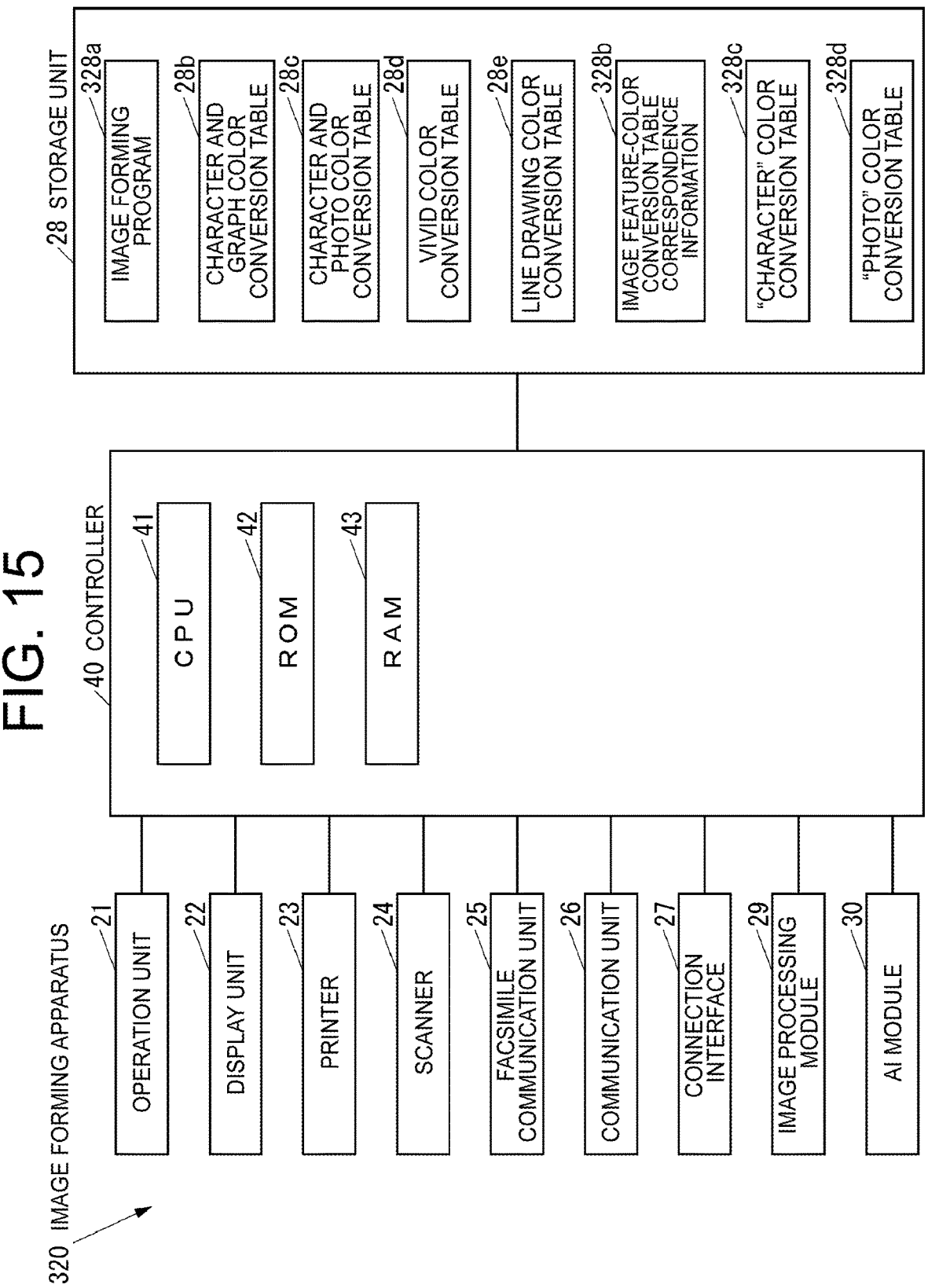
FIG. 15 is a block diagram of an image forming apparatus of an image forming system according to a third embodiment of the present disclosure.

FIG. 15 is a block diagram of an image forming apparatus 320 of the image forming system according to the present embodiment.

The configuration of the image forming system according to the present embodiment is the same as the configuration in which the image forming system 10 (see FIG. 1) includes the image forming apparatus 320 shown in FIG. 15 instead of the image forming apparatus 20 (see FIG. 2).

In the configuration of the image forming apparatus 320, the image forming apparatus 20 includes an image forming program 328a instead of the image forming program 28a (see FIG. 2). Further, the configuration of the image forming apparatus 320 is the same as that of the image forming apparatus 20, which includes image feature-color conversion table correspondence information 328b indicating the correspondence between a feature of an image and a color conversion table, a "character" color conversion table 328c which is a color conversion table suitable for being used for an image only including a character, and a "photo" color conversion table 328d which is a color conversion table suitable for being used for an image only including a photo. For example, the feature of an image is indicated by the number of each elements such as text, vector (line), and a photo, and the ratio of the size in the image.

Figure 16:
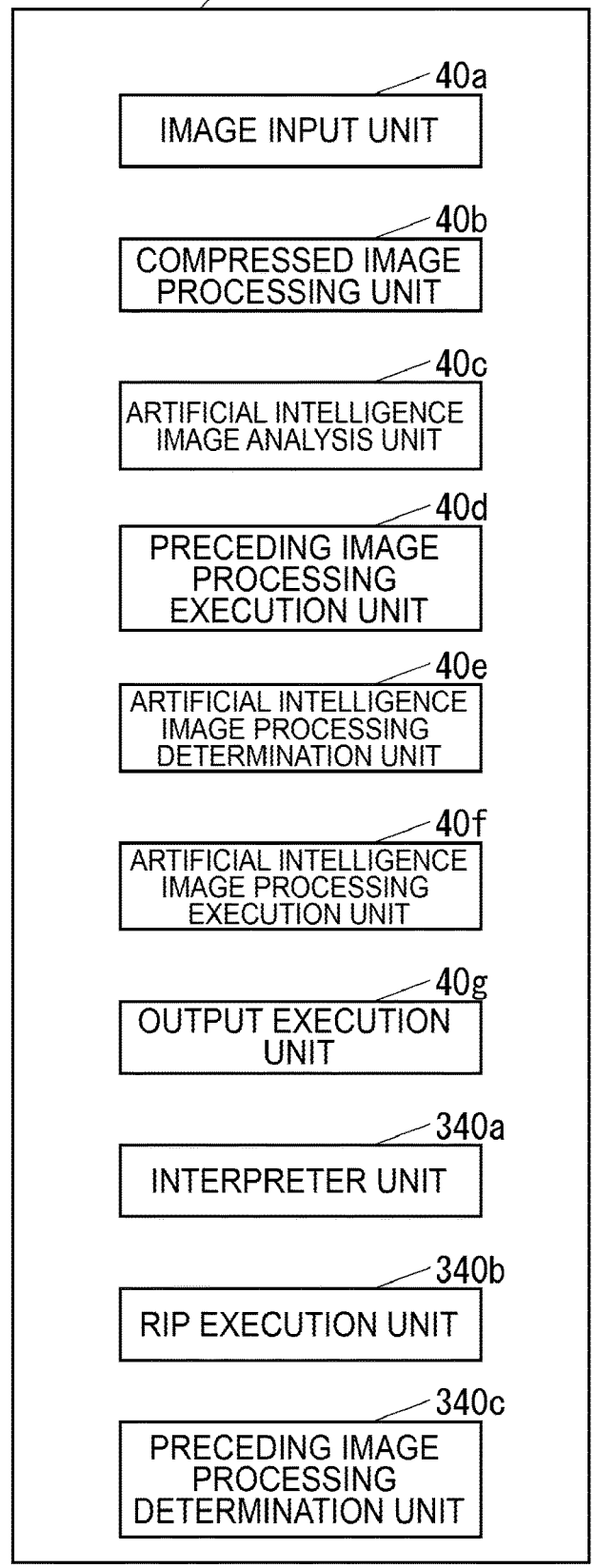
FIG. 16 is a functional block diagram of the image forming apparatus shown in FIG. 15.

FIG. 16 is a functional block diagram of the image forming apparatus 320.

As shown in FIG. 16, the controller 40 executes the image forming program 328a (see FIG. 12), to realize an image input unit 40a, a compressed image processing unit 40b, an artificial intelligence image analysis unit 40c, a preceding image processing execution unit 40d, an artificial intelligence image processing determination unit 40e, an artificial intelligence image processing execution unit 40f, an output execution unit 40g, an interpreter unit 340a for interpreting image data described in a page description language, a raster image processor (RIP) execution unit 340b which executes RIP processing for generating a raster image from image data, and a preceding image processing determination unit 340c which determines preceding image processing to be executed by the preceding image processing execution unit 40d.

Next, the operation of the image forming system according to the present embodiment will be described.

The operation of the image forming system according to the present embodiment is the same as that of the image forming system 10 according to the first embodiment (see FIG. 1), except for the points described below.

In the present embodiment, it is assumed that the image input in S121 is either an image transmitted from the computer 50 or an image stored in an external storage medium connected to the connection interface 27.

FIG. 17 is a flowchart showing a part of the operation of the image forming apparatus 320 when executing an output based on an image.

As shown in FIG. 17, when executing an output based on an image, the image forming apparatus 320 executes the processing of S351 to S354 between the processing of S121 and the processing of S122.

After the processing of S121, the interpreter unit 340a interprets the image input in S121, that is, the image data described in the page description language (S351).

The RIP execution unit 340b executes the RIP processing after the processing of S351 (S352).

After the processing of S352, the preceding image processing determination unit 340c determines whether a feature of the image has been detected based on at least one of the interpretation of the image data executed in S351 and the RIP processing executed in S352 (S353).

When the preceding image processing determination unit 340c determines in S353 that the feature of the image has been detected, the preceding image processing determination unit 340c determines the preceding image processing based on the detected feature of the image determined in S353 and the image feature-color conversion table correspondence information 328b (S354). For example, when the element of the image is mainly text, the preceding image processing determination unit 340c may determine the image processing using the "character" color conversion table 328c as the preceding image processing. Further, when the element of the image is mainly a photo, the preceding image processing determination unit 340c may determine the image processing using the "photo" color conversion table 328d as the preceding image processing. Further, when the element of image is mainly a vector (line), the preceding image processing determination unit 340c may determine the image processing using the "line drawing" color conversion table 28e as the preceding image processing. Further, when the elements of the image are mainly both text and a photo, the preceding image processing determination unit 340c may determine the image processing using the "character and photo" color conversion table 28c as the preceding image processing.

When the preceding image processing determination unit 340c determines in S353 that the feature of the image has not been detected or completes the processing of S354, the compressed image processing unit 40b executes the processing of S122.

The preceding image processing execution unit 40d executes in S162 the preceding image processing determined in S354 (see FIG. 9).

Note that the processing of S353 to S354 may be executed between the processing of S122 and the processing of S123 (see FIG. 6), or may be executed between the processing of S123 and the processing of S126 (see FIG. 7).

Further, the process from S 353 to S 354 may be executed during the process in S351 or during the process in S352.

As described above, before starting to execute the preceding image processing on the image, the image forming apparatus 320 starts to execute the RIP processing (S352), and determines the preceding image processing based on the feature of the image detected by the RIP processing to be executed (S354). Therefore, it is possible to improve the possibility that the artificial intelligence image processing is the same as the preceding image processing. As a result, the image forming apparatus 320 shortens the time from when the image is input in S121 to when the output based on the image is executed.

Before starting to execute the preceding image processing on the image, the image forming apparatus 320 starts to interpret the image data described in the page description language (S351), and determines the preceding image processing based on the feature of the image detected by the interpretation of the image data described in the page description language (S354). Therefore, it is possible to improve the possibility that the artificial intelligence image processing is the same as the preceding image processing. As a result, the image forming apparatus 320 shortens the time from when the image is input in S121 to when the output based on the image is executed.

In each of the above-described embodiments, the designated image processing, the preceding image processing, and the artificial intelligence image processing are the image processing using the color conversion tables. However, the image forming apparatus of the present disclosure may employ image processing other than the image processing using the color conversion tables as the designated image processing, the preceding image processing, and the artificial intelligence image processing. For example, the image forming apparatus of the present disclosure may employ image processing such as screen processing, smoothing and edge enhancement as the designated image processing, the preceding image processing, and the artificial intelligence image processing.

What is claimed is:

1. An image forming apparatus comprising:
a memory that stores an image; and
a control unit that includes a processor to execute image processing of the image stored in the memory,
wherein the control unit effects by the processor:
an artificial intelligence image analysis unit configured to perform analysis of the image itself stored in the memory by artificial intelligence;
an artificial intelligence image processing determination unit configured to determine image processing of the image, corresponding to an analysis result by the artificial intelligence image analysis unit among a plurality of kinds of image processing;
an artificial intelligence image processing execution unit configured to execute the image processing of the image, determined by the artificial intelligence image processing determination unit; and
an output execution unit configured to execute an output of the image subjected to the image processing by the artificial intelligence image processing execution unit.

2. The image forming apparatus according to claim 1, wherein the control unit effects, by the processor, a preceding image processing execution unit configured to execute preceding image processing as the image processing of the image, to be executed prior to the image processing by the artificial intelligence image processing execution unit, among the plurality of kinds of image processing,
wherein when the image processing determined by the artificial intelligence image processing determination unit is the same as the preceding image processing, the output execution unit executes an output of the image on which the preceding image processing is executed, instead of the image on which the image processing is executed by the artificial intelligence image processing execution unit.

3. The image forming apparatus according to claim 2, wherein the preceding image processing execution unit loads the image from a non-volatile storage device to a volatile storage device to execute the preceding image processing on the image loaded to the volatile storage device,
wherein when the image processing determined by the artificial intelligence image processing determination unit is not the same as the preceding image processing, the artificial intelligence image processing execution unit starts to execute the image processing determined by the artificial intelligence image processing determination unit to the image loaded to the volatile storage device by the preceding image processing execution unit, and
wherein when the image processing determined by the artificial intelligence image processing determination unit is not the same as the preceding image processing, the output execution unit executes an output based on the image to which the image processing is executed by the artificial intelligence image processing execution unit.

4. The image forming apparatus according to claim 2, wherein the control unit effects by the processor:
an image input unit configured to input the image; and
a preceding image processing determination unit configured to determine the preceding image processing of the image, to be executed by the preceding image processing execution unit,
wherein the preceding image processing determination unit determines the preceding image processing of the image, based on a file format of the file when the image is input as a file by the image input unit.

5. The image forming apparatus according to claim 2, comprising: wherein the control unit effects by the processor:
an image input unit configured to input the image; and
a preceding image processing determination unit configured to determine the preceding image processing of the image, to be executed by the preceding image processing execution unit,
wherein when the image is input as printable data by the image input unit, the preceding image processing determination unit determines a file format of an original file of the image based on the printable data, and determines the preceding image processing of the image, based on the file format determined.

6. The image forming apparatus according to claim 2, wherein the control unit effects by the processor:
a raster image processor (RIP) execution unit configured to execute RIP processing for generating a raster image from data of the image; and
a preceding image processing determination unit configured to determine the preceding image processing of the image, to be executed by the preceding image processing execution unit,
wherein the RIP processing unit starts to execute the RIP processing before the preceding image processing execution unit starts to execute the preceding image processing of the image, and
wherein the preceding image processing determination unit determines the preceding image processing of the image, based on a feature of the image detected by the RIP processing executed by the RIP execution unit.

7. The image forming apparatus according to claim 2, wherein the control unit effects by the processor:
an interpreter unit configured to interpret data of the image described in a page description language; and
a preceding image processing determination unit configured to determine the preceding image processing of the image, to be executed by the preceding image processing execution unit,
wherein the interpreter unit starts to interpret the data of the image before the preceding image processing execution unit starts to execute the preceding image processing of the image, and
wherein the preceding image processing determination unit determines the preceding image processing of the image, based on a feature of the image detected by the interpretation of the data of the image executed by the interpreter unit.

8. The image forming apparatus according to claim 1, wherein the artificial intelligence image analysis unit performs the analysis of the image itself from viewpoints of elements thereof by the artificial intelligence.

9. The image forming apparatus according to claim 1, wherein the memory further stores a plurality of different color conversion tables which are suitable for use in a plurality of different types of image, respectively, and
wherein the artificial intelligence image processing determination unit determines the image processing using a color conversion table corresponding to the analysis result from among the plurality of different color conversion tables.

10. A non-transitory computer-readable recording medium that stores an image forming program for causing an image forming apparatus to execute:
performing analysis of the image itself by artificial intelligence;
determining image processing of the image, corresponding to an analysis result by the artificial intelligence image analysis unit among a plurality of kinds of image processing;
executing the image processing determined by the artificial intelligence image processing determination unit on the image; and
executing an output of the image on which the image processing is executed.

11. The non-transitory computer-readable recording medium according to claim 10, wherein the performing the analysis includes performing the analysis of the image itself from viewpoints of elements thereof by the artificial intelligence.

12. The non-transitory computer-readable recording medium according to claim 10, wherein the determining the image processing includes determining the image processing using a color conversion table corresponding to the analysis result from among a plurality of different color conversion tables which are suitable for use in a plurality of different types of image, respectively.

* * * * *